J. B. Draper.
Earth Auger.
No. 83,611. Patented Nov. 3, 1868.
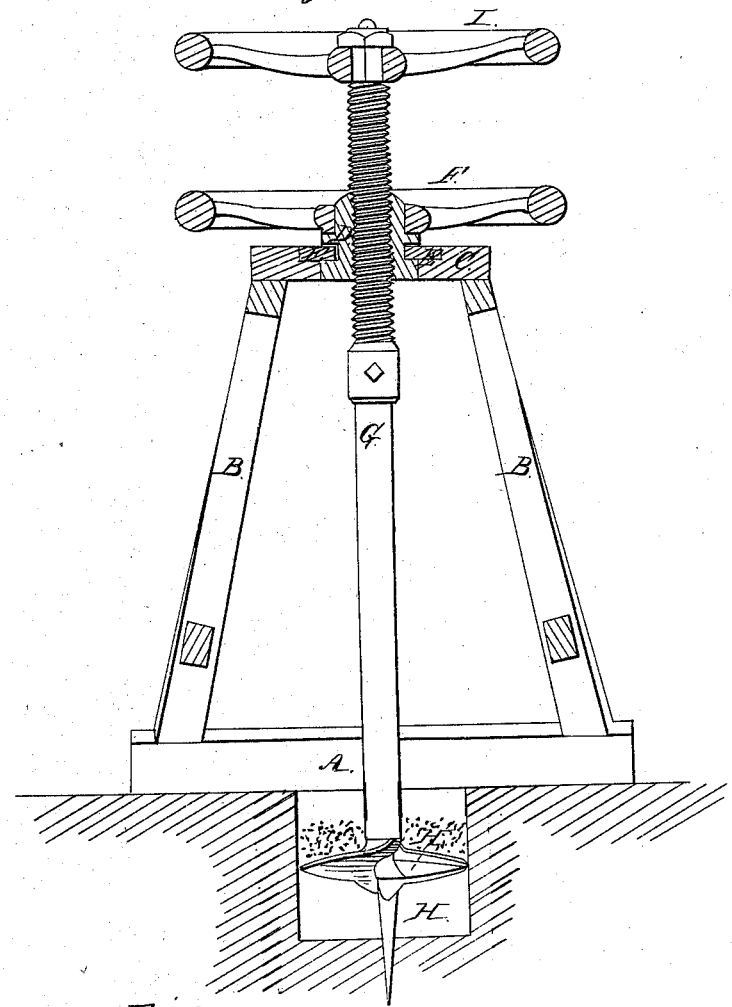
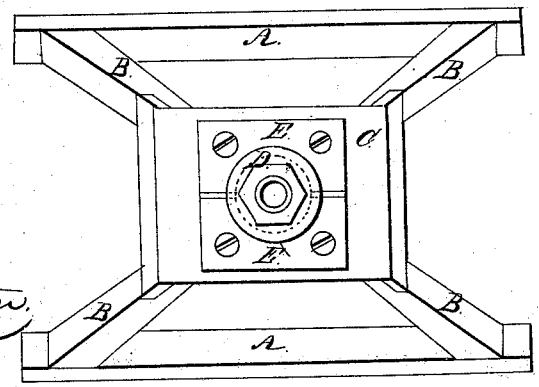
Witnesses:
W. B. Denning
Wm. H. Brereton
Inventor:
John B. Draper
By Knight Bros
Attys.

JOHN B. DRAPAR, OF SALEM, ILLINOIS.

Letters Patent No. 83,611, dated November 3, 1868.

IMPROVED POST-AUGER.

The Schedule referred to in these Letters Patent and making part of the same.

*To all whom it may concern:*

Be it known that I, JOHN B. DRAPAR, of Salem, in the county of Marion, and State of Illinois, have invented a new and useful Improvement in Post-Hole Augers; and I do hereby declare the following to be a full, clear, and exact description thereof, reference being had to the accompanying drawings, which are made a part of this specification, and in which—

Figure 1 is a view, partly in elevation and partly in vertical section.

Figure 2 is plan or top view of the stand, the auger-shaft and the two operative wheels being removed.

The machine has a screw-shaft, armed with an auger and point at its lower end. It rotates in a nut, set into the bridge-piece of a portable stand, which is placed over the spot where the hole is to be bored. The screw-shaft is rotated by a wheel, to drive the auger into the ground. The proper depth being reached, the nut is rotated by another wheel, which lifts the auger vertically, without rotating it, and withdraws the earth which rests upon the auger-blade.

In the drawings, A are the sills, B the stand, and C the bridge-piece of the stand which supports the borer. D is a nut, secured by half plates, E, whose semicircular abutting edges enter a groove in the nut, and allow it to rotate at proper times, without changing its position vertically. The upper portion of the nut is hexagonal, or presents facets, which enable the wheel F to set securely thereon, the wheel being the means for rotating the nut for the purpose of withdrawing the auger.

The shaft G has a threaded portion at least as long as the depth of any hole to be bored by the machine, though it is not essential to the operation of the machine that the hole should be bored to the full depth for which provision is made. At the lower end of the shaft is a point, H, and somewhat above the latter is a flanged foot or lip, H', of the usual kind. On the summit of the shaft is a wheel, I, by which it is rotated.

The operation is as follows:

The machine being set over the place where the hole is to be bored, the shaft G is rotated by the wheel I, driving the auger into the soil until the wheel I comes in contact with the wheel F, or until the required depth is reached, short of that limit. During this time, the wheel F is restrained from rotating, by the hand, or by a stop, as may be convenient.

The wheel F is then rotated in the same direction as the former one, while the wheel I and the shaft are restrained from rotating, and the result is, that the shaft rises vertically as its thread is traversed by the nut, withdrawing the auger and its load of soil from the hole. The soil is then discharged, and the machine moved over the place where the next hole is to be bored.

Having described my invention,

What I claim as new, and desire to secure by Letters Patent, is—

The arrangement of the screw-shaft G, with its wheel I, and the nut D, with its wheel F, and restraining-plates E, operating respectively for the rotation and insertion of the auger, and for its upward withdrawal, substantially as described and represented.

To the above specification of my improved post-hole auger, I have signed my hand, this 19th day of August, 1868.

JOHN B. DRAPAR.

Witnesses:
 J. O. CHANCE,
 I. N. MOORE.